Nov. 11, 1924.
W. M. SMITH
OIL GAUGE
Filed Feb. 20, 1923
1,515,524
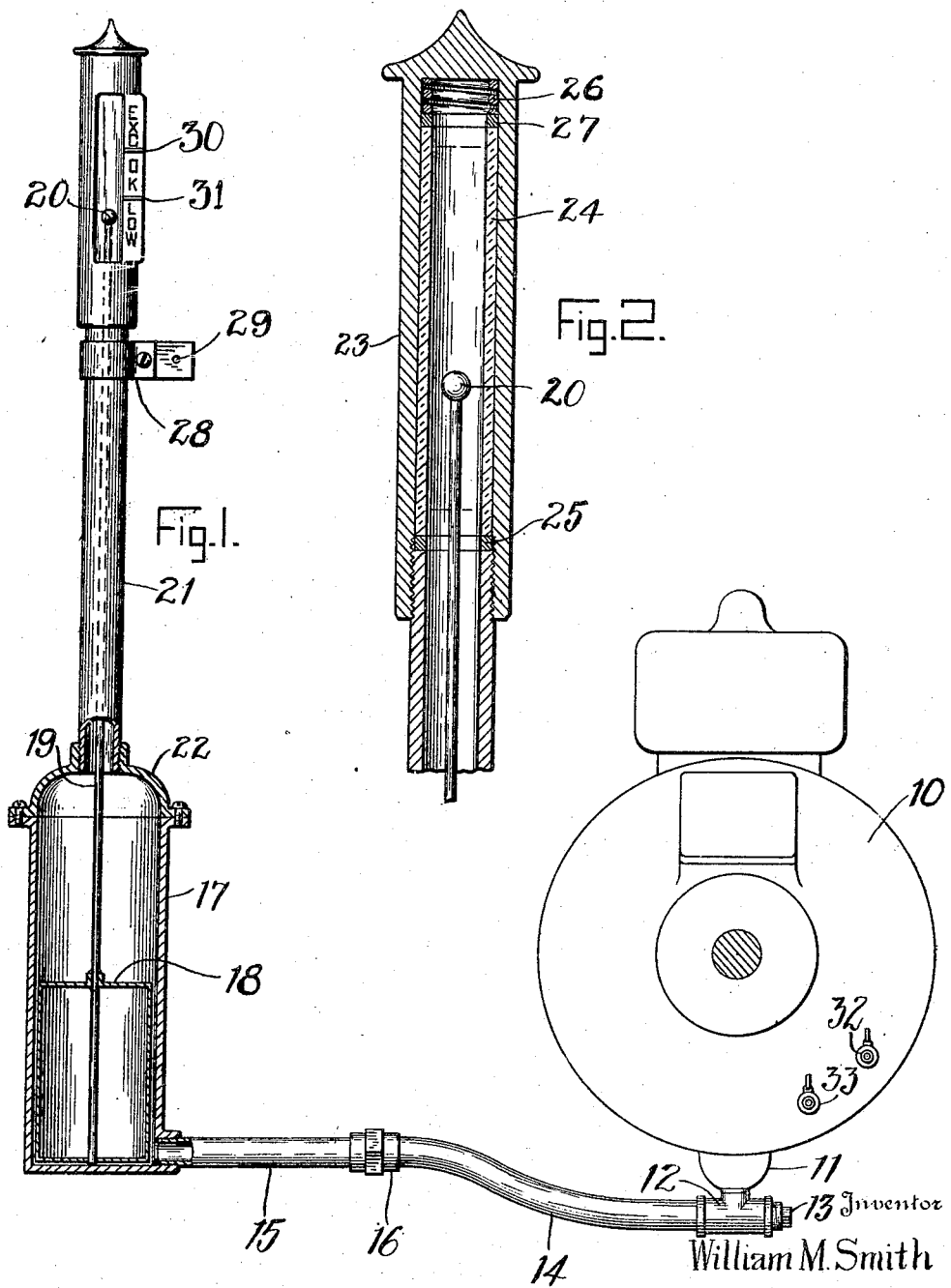
Inventor
William M. Smith Patented Nov. 11, 1924.

1,515,524

UNITED STATES PATENT OFFICE.

WILLIAM M. SMITH, OF MEMPHIS, TENNESSEE, ASSIGNOR OF ONE-HALF TO ROBERT A. BERRYMAN, OF MEMPHIS, TENNESSEE.

OIL GAUGE.

Application filed February 20, 1923. Serial No. 620,280.

*To all whom it may concern:*

Be it known that I, WILLIAM M. SMITH, a citizen of the United States, residing at Memphis, in the county of Shelby and State of Tennessee, have invented certain new and useful Improvements in Oil Gauges, of which the following is a specification.

My said invention relates to an oil gauge designed particularly for use with automobiles and it is an object of the invention to provide a gauge which shall be simple in construction and certain in operation and which shall be visible from the driver's seat.

Referring to the accompanying drawings, which are made a part hereof and on which similar reference characters indicate similar parts, Figure 1 is an elevation of my device in working position looking from the rear, certain parts being broken away for better disclosure, and Figure 2 is a section of that part of the same which is above the floor of the automobile.

In the drawings reference character 10 indicates a part of the crank case having at its underside a nipple 11 ordinarily closed by a plug which may be removed to drain the crank case. When the device of my invention is applied this plug is left off and a union 12 is applied thereto, said union having at one end a drainage plug 13 by which the crank case may be completely emptied. At the other end of the union are pipes 14 and 15 connected by a union 16 so that if it should be necessary to remove the motor from the machine this can be done without disturbing the oil gauge by disconnecting the pipe sections 14 and 15. At the other end of the section 15 is a casing 17 for a float 18, here shown as hollow but which may be made of cork or the like if preferred. The float is secured to the lower end of a rod 19 carrying at its upper end a ball 20. Surrounding the middle portion of the rod is a tube 21 connected to the casing 17 by a head 22. Mounted on the tube 21 is a hollow head 23 closed at its upper end. Within the head 23 is a glass tube 24 equal in size to tube 21 and resting on the upper end thereof, the joint between them being sealed by a packing 25. A spring 26 is interposed between the glass tube 24 and the upper end of the head 23, the spring resting on a packing ring 27 and forcing the tube 24 downward to maintain a close fit in the joint between this tube and tube 21.

A bracket 28 here shown as consisting of a bent strip of metal surrounding the tube 21 is provided for holding the upper end of the gauge in place, the lower end being held by the connection between union 12 and nipple 11. In a preferred embodiment of the invention the clamp 28 is located directly beneath the floor board of the machine and is provided with a hole at 29 in position to receive a bolt in a body bracket of the Ford automobile. When used in other cars this hole furnishes means for fastening the gauge in place by a bolt or a screw.

The casing section 23 is provided with an opening at one side to expose the glass and thus the ball 20. At one side of the opening I provide indicating means here shown as having the form of a plate with lines at 30 and 31 spaced apart the same distance as the petcocks on the Ford automobile. It will be understood that for use in other cars the marks will be spaced properly to correspond to the safety limits for the oil level. Beneath the line 31 I have shown the word "Low" on the plate and above the line 30 I placed part or all of the word "Excess." The space between the lines may be left blank or be supplied with some such legend as "O. K." The casing 20 in the preferred embodiment of the invention will project above the floor board of the car between the emergency brake lever and the adjacent body member.

Having thus fully described my said invention, what I claim as new and desire to secure by Letters Patent, is:

In a liquid level indicator having a chamber with a float therein supporting an indicator and means establishing communication between said chamber and the liquid to be measured, an indicator housing comprising a tubular support and a sleeve secured to the upper end of said support, said sleeve being closed at its upper end and having an elongated window through which the indicator may be viewed, a gauge tube inclosed by said sleeve, a gasket interposed between the lower end of the gauge tube and the upper end of said tubular support, a second gasket on the upper end of said gauge tube and a spring interposed between said last mentioned gasket and the closed end of the sleeve, substantially as set forth.

In witness whereof, I have hereunto set my hand and seal at Memphis, Tennessee this 14th day of February A. D. nineteen hundred and twenty-three.

WILLIAM M. SMITH. [L. S.]

Witnesses:
　JOHN W. FARLEY,
　F. M. BAILEY.